United States Patent Office 3,024,084
Patented Mar. 6, 1962

3,024,084
SEPARATION OF PLATINUM FROM OTHER METALS
Alan R. Raper, Ealing, London, Francis S. Clements, Naphill, and Samuel J. R. Fothergill, Kingswood, England, assignors to The International Nickel Company, Inc., New York, N.Y., a corporation of Delaware
No Drawing. Filed Oct. 26, 1959, Ser. No. 848,544
Claims priority, application Great Britain Dec. 24, 1958
5 Claims. (Cl. 23—51)

The present invention relates to the refining of the platinum group metals and, more particularly, to a method of producing platinum salts of relatively high purity from platinum solutions contaminated with other metals of the platinum group.

In the refining of platinum metal concentrates or scrap, platinum must commonly be separated from acid chloride solutions containing base metals and other precious metals such as gold, palladium, iridium and rhodium. It is usual practice to heat the concentrate or scrap with aqua regia which leads to the production of solutions containing small amounts of nitric acid, nitro and nitrosyl compounds. Owing to certain undesirable effects of these nitro compounds in the refining processes, they should be removed before precipitation of the platinum by evaporation or by treating the solution with formic acid. After removal of gold by the addition of a suitable reducing agent, the platinum is precipitated as ammonium hexachloroplatinate $(NH_4)_2(PtCl_6)$ by the addition of an excess of ammonium chloride. The precipitation of platinum is represented by the equation:

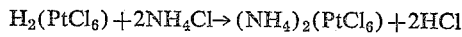

Some or all of the palladium and rhodium in the solution at the time of the precipitation of the platinum salt is present as the soluble salts ammonium tetrachloropalladate and ammonium hexachlororhodate, most of which remain in solution. The precipitate of ammonium hexachloroplatinate $(NH_4)_2(PtCl_6)$ is, however, always contaminated with appreciable amounts of rhodium or palladium or iridium depending on the concentrations of these metals in solution at the time of the precipitation of the platinum salt. When iridium is present, the amount of this metal that is coprecipitated with the platinum depends on the proportions present as quadrivalent iridium and trivalent iridium. Iridium present as quadrivalent ammonium hexachloriridate $(NH_4)_2(IrCl_6)$ will be almost quantitatively precipitated, whereas iridium present as trivalent $(NH_4)_3(IrCl)_6$ will be precipitated to a much smaller extent. Accordingly, any quadrivalent iridium present must be reduced to the trivalent state before precipitation of the platinum. If the separation of gold has been carried out previously, for example, by the addition of ferrous sulfate, the iridium will have been reduced to the trivalent state and no further special steps are necessary.

The same general principles apply to the refining of secondary metal scrap, for example, catalyst gauzes, spinnerets, jewelry alloys and thermocouples.

The purity of the platinum salt obtained by using ammonium chloride as precipitant can vary appreciably according to the mode and conditions of precipitation. Under the best conditions, precipitation from a solution containing, for example, 5 grams of platinum and 0.5 gram of palladium in 50 milliliters of solution and ignition of the product to metal gives a platinum sponge still containing about 0.8% of palladium. On dissolving the product in aqua regia and repeating the operations, the platinum sponge so obtained still contains about 0.08% of palladium. By redissolving the product and repeating the precipitation several times, it is possible, eventually, to get platinum of any desired degree of purity, but it is tedious and involves some loss of platinum in the mother liquors and mechanical losses due to the multiple operations.

In refining platinum-rhodium alloys, the same general method is used and the rhodium content of the platinum recovered from scrap alloy consisting of 90% platinum and 10% rhodium is usually about 1.8% or more after the first refining cycle. A repetition of the process will reduce the rhodium content of the platinum to about 0.45%.

As a further example of the difficulties inherent in the prior art process involving the use of ammonium chloride as a precipitant, a solution of 5 grams of platinum and 0.25 gram of trivalent iridium in 50 milliliters of solution gives an unsatisfactory platinum sponge which contains about 1.4% iridium. Although attempts were made to overcome the foregoing difficulties, none, as far as we are aware, was entirely successful when carried into practice commercially on an industrial scale.

It has now been discovered that through the use of a special process, a chloroplatinic salt can be produced from solutions contaminated by other platinum group metals which salt is substantially purer than heretofore obtainable from comparable solutions.

It is an object of the present invention to provide an improved process for recovering platinum from acid chloride platinum solutions contaminated with other platinum group metals.

Another object of the invention is to provide an improved process for separating platinum from acid chloride solutions containing platinum in admixture with other platinum group metals.

Other objects and advantages will become apparent from the following description.

Generally speaking, the present invention contemplates a process for separating platinum as ammonium chloroplatinate from acid chloride platinum solutions contaminated with other platinum group metals in solution, which comprises pretreating said solution to establish the platinum group metals other than platinum in valence states characterized by solubility of the ammonium acid salts of said metals and to establish platinum in the platinic valence state, i.e., chloroplatinic acid, adding to said solution a water-soluble hydrolyzable amide and precipitating platinum therefrom as ammonium chloroplatinate while hydrolyzing said amide. The ammonium ions necessary to form the ammonium compounds of the precious metals are provided by the hydrolysis of an amide in the acid solution, instead of by the addition of a solution of ammonium chloride. Any water soluble amide which will readily hydrolyze in acid solutions to yield ammonium ions can be used, but urea is particularly suitable, as well as being relatively cheap and readily available. Other suitable amides include formamide and acetamide. The platinum salt obtained by means of the invention is less contaminated by palladium or rhodium or iridium, as the case may be, than when ammonium chloride is used.

The rate of hydrolysis of the amide, and thus, the rate of formation of ammonium ions and in turn the rate of precipitation of the platinum salt, can be regulated by varying the temperature and acidity of the solution, a higher temperature and higher acidity increasing the rate of hydrolysis. Urea hydrolyzes slowly in acid solution and is, therefore, preferably used at or near the boiling point of the solution. The acid hydrolysis of acetamide is faster, so that a lower temperature, e.g., 50° C. may be used, and, with formamide, room temperature is satisfactory.

In carrying the invention into practice, advantageous results are obtained when the precipitate of ammonium chloroplatinate is removed by filtration as soon as the precipitation is substantially complete. Enough urea must be used to ensure that all the platinum is converted into the ammonium compound and in practice, a large excess of urea over the theoretical amount must be used and the solution boiled for several hours. When only a single precipitation step is used, it is preferred to use three to five times the theoretical amount of urea and to boil for about six hours. Of course, sufficient acid must be present in order to hydrolyze the amide and still maintain the required acidity. Advantageously, the solution can contain hydrochloric acid in an amount of about 100% in excess of the amount stoichiometrically required to hydrolyze the amide in order to accelerate the rate of hydrolysis of the urea.

The first precipitate of platinum salt may, of course, be ignited to sponge, redissolved and the platinum reprecipitated by further treatment with an amide.

The conditions required when acetamide is used in the separation of platinum from palladium differ somewhat from those for urea. Enough acetamide must be used to ensure that all the platinum is converted into the ammonium compound and, in practice, an excess of acetamide over the theoretical amount must be used. However, the amount of palladium contaminating the final platinum increases if too much acetamide is used.

Formamide hydrolyzes in dilute acid solution much more readily than acetamide and when excess formamide is added to a solution of platinum and palladium in dilute hydrochloric acid, separation of ammonium hexachloroplatinate begins at room temperature in a few minutes and visible precipitation is complete in less than one hour. The solution should not be heated much above 50° C. as the formic acid produced may reduce the soluble palladium salt to metal. Formamide is not as satisfactory as urea or acetamide in separating platinum and palladium from one another, but is much superior to ammonium chloride.

When employing the novel process of the present invention, it is necessary to pretreat the platinum-containing solutions in exactly the same manner as done by the prior art. Thus, nitroso compounds should be removed. Iridium must be placed in the trivalent state and gold should be removed.

For the purpose of giving those skilled in the art a better understanding of the invention, the following illustrative examples are given:

EXAMPLE I

Three acid solutions of chloroplatinic acid which had been treated with formic acid to eliminate nitro-compounds, were treated with urea in order to precipitate platinum. The solutions initially contained approximately 100 grams per liter (g./l.) of platinum and 0.17 gram per liter of palladium, the palladium content of the solution thus being 0.17% of the platinum content. After urea was added, the solutions were mixed with the amounts of concentrated hydrochloric acid shown in Table I and boiled for 6 hours with stirring. After cooling, the precipitates were removed by filtration, washed with ammonium chloride solution, dried, wrapped in filter paper and ignited. The data and the results of the treatment are set forth in Table I:

*Table I*

| Expt. No. | Pt soln. (mls.) | HCl (mls.) | Urea (g.) | Yield of Pt (percent) | Pd in Pt (percent) |
|---|---|---|---|---|---|
| A | 50 | 25 | 6 | 94.4 | 0.0007 |
| B | 50 | 20 | 6 | 90 | 0.0006 |
| C | 200 | 200 | 30 | 96.6 | 0.0006 |

In a comparative experiment using ammonium chloride as precipitant, 50 milliliters of the same solution were heated to boiling with 50 milliliters of concentrated hydrochloric acid, 7.0 grams of ammonium chloride dissolved in 25 milliliters of hot water were added and the solution was boiled for one hour longer. An almost theoretical yield of the platinum was obtained contaminated with 0.017% of palladium. It is to be noted that by means of the present invention, the impurity level of the precipitated platinum was greatly decreased.

EXAMPLE II

As an example of the separation of platinum from palladium on a small scale, solutions containing 100 g./l. of platinum and 5 and 10 g./l. of palladium were prepared. To a 50 ml. portion of each solution, 4 grams of acetamide was added and the resultant liquid was heated for 6 hours at 40° C. to 50° C. After cooling, the precipitate was removed by filtration, washed with ammonium chloride solution, dried, wrapped in filter paper and ignited.

The results obtained were as follows:

| Grams in 50 milliliters of solution | | Grams of Pt recovered | Percent Pd in Pt recovered |
|---|---|---|---|
| Pt | Pd | | |
| 5 | 0.25 | 4.993 | 0.018 |
| 5 | 0.5 | 4.996 | 0.027 |

By way of comparison, the results obtained when ammonium chloride was added to identical specimens of the same solutions in accordance with the process usual hitherto were:

| Grams in 50 milliliters | | Grams of Pt recovered | Percent Pd in Pt recovered |
|---|---|---|---|
| Pt | Pd | | |
| 5 | 0.25 | 5.001 | 0.69 |
| 5 | 0.5 | 5.028 | 1.04 |

On increasing the amount of acetamide from 4 to 6 grams, the percentage of palladium in the platinum recovered from the solution containing 5 grams of platinum and 0.5 gram of palladium increased to 0.039.

On carrying out the separation of platinum from palladium on an industrial scale, 12.4 kg. of crude platinum was dissolved in a mixture of 60 liters of hydrochloric acid, 11 liters of nitric acid and 45 liters of water. After filtration, the platinum was precipitated with 16 kg. of ammonium chloride at 60° C. and allowed to cool overnight, i.e., the platinum was precipitated from approximately 10% solution using 6.45 grams ammonium chloride per 5 grams platinum. On applying this method on a laboratory scale to a crude platinum concentrate containing 0.47% palladium, the percentage of palladium in the platinum recovered was found to be 0.16%. On using acetamide instead of ammonium chloride at the rate of 4 grams of acetamide per 5 grams of platinum, the percentage of palladium in the platinum recovered was found to be 0.006%.

The separation of platinum from rhodium is more difficult to effect than that of platinum from palladium, but the use of amides leads to much improved results compared with those obtained by the old method using ammonium chloride. Thus, in 50 milliliters of a solution containing 4.95 grams of platinum and 0.55 gram of rhodium, the addition of 3 grams of ammonium chloride (10% excess) at 60° C. yielded platinum containing 1.94% rhodium. In contrast, 3.3 grams acetamide (also 10% excess) at 50° C. yielded platinum containing only 0.32% rhodium. On treating both platinum products a second time in the same way, the rhodium content of that obtained with acetamide was reduced to 0.03%, whereas that obtained with ammonium chloride was 0.46%.

As already indicated, before precipitating platinum from solution, any quadrivalent iridium must be reduced so that any salts formed are the trivalent soluble salts.

EXAMPLE III

A series of solutions of chloroiridic acid and chloroplatinic acid were mixed and the iridium was reduced to the trivalent state. The results of treating these solutions are given in Table II.

Table II

| Solution | Grams Pt. | Grams Ir | Precipitation effected by— | Yield of Pt (gms.) | Percent Ir in Pt |
|---|---|---|---|---|---|
| C | 4 | 0.2 | Adding 4 gms. acetamide, heating for 12 hrs. at 40° C. and allowing to cool overnight. | 3.9198 | 0.45 |
| D | 4 | 0.2 | Adding 3 mls. formamide and maintaining the temperature at 3° C. for 24 hrs. | 3.8846 | 0.40 |

It will be seen that although the process of the invention applied to iridium-containing solutions does not yield platinum as pure as that obtained from solutions containing palladium, there is a substantial improvement in the purity of the metal as compared to the prior practice. Thus, a solution identical to those in Table II was treated with hot ammonium chloride solution. The iridium percentage in the recovered platinum was 1.31% with a yield of 3.9708 grams. That the invention is applicable to solutions containing two or more contaminating metals is shown by the following example.

EXAMPLE IV

Portions of a solution containing 256 g./l. of platinum, 0.53 g./l. of palladium (approximately 0.2% of the platinum content) and undetermined amounts of rhodium, ruthenium, iridium and gold, were treated with ammonium chloride and with urea. In each case 25 milliliters of the platinum solution was filtered and diluted with 25 milliliters of water, before adding the precipitant. The results are given in Table III and show that improved separation of platinum from palladium, rhodium, gold and iridium was obtained by the use of urea.

Table III

| Element | NH₄Cl (8.5 g.) | Urea (12 g. boiled 6 hours) |
|---|---|---|
| Pt | Yield=6.388 g. | Yield=6.323 g. |
| Pd | 0.046% | 0.0002%. |
| Rh | About 2.1% | 0.32%. |
| Ru | <0.01% | <0.01%. |
| Ir | 0.1% | <0.01%. |
| Au | 0.0005% | <0.0001%. |

Percentages are by weight of the platinum precipitated.

From the foregoing examples, it to be observed that the present invention is applicable to a wide range of percentage of contaminant. For example, the present invention is applicable to solutions wherein the ratio of platinum to platinum metal contaminant can be as high as at least about 1000 to 1 to as low as about 1 to 10 or even lower.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In the process for separating platinum as ammonium chloroplatinate from aqueous acid chloride platinum solutions contaminated with other platinum group metals in solution wherein the solution contains the platinum group metals other than platinum in valence states characterized by solubility of the ammonium acid salts of said metals in water and platinum in the platinic valence state, the improvement comprising adding to said platinum solution a water soluble hydrolyzable amide, precipitating platinum from said solution as ammonium chloroplatinate while hydrolyzing said amide in the presence of excess hydrochloric acid and, after substantial completion of the precipitation, promptly recovering the precipitated ammonium chloroplatinate from said solution.

2. A process as set forth and defined in claim 1, wherein the water soluble, hydrolyzable amide is urea and the hydrolysis is carried out at a temperature in the vicinity of the boiling point of the solution.

3. A process as set forth and defined in claim 1, wherein the water soluble, hydrolyzable amide is acetamide.

4. A process as set forth and defined in claim 1, wherein the water soluble, hydrolyzable amide is formamide.

5. In the process for separating platinum as ammonium chloroplatinate from aqueous acid chloride platinum solutions contaminated with other platinum group metals in solution wherein the solution contains the platinum group metals other than platinum in valence states characterized by the solubility of the ammonium acid salts of said metals in water and platinum in the platinic valence state, the improvement comprising adding to said platinum solution an amount of urea over and above that amount sufficient to produce by hydrolysis the ammonium ion necessary to induce a quantitive precipitate of ammonium chloroplatinate, precipitating platinum therefrom as ammonium chloroplatinate by hydrolyzing said urea at a temperature in the vicinity of the boiling point of the solution in the presence of hydrochloric acid in an amount sufficient to maintain the initial acidity of the solution and, after substantial completion of the precipitation, promptly recovering the precipitated ammonium chloroplatinate from said solution.

References Cited in the file of this patent

UNITED STATES PATENTS 2,726,141     Appell _____ Dec. 6, 1955

OTHER REFERENCES

Hample: Rare Metals Handbook, 1954, Reinhold Publ. Corp., pp. 295–306.